United States Patent
Ueda et al.

(10) Patent No.: US 11,490,179 B2
(45) Date of Patent: Nov. 1, 2022

(54) ULTRASONIC SENSOR

(71) Applicant: DENSO CORPORATION, Kariya (JP)

(72) Inventors: Keisuke Ueda, Kariya (JP); Takeo Tsuzuki, Kariya (JP); Taketo Harada, Nisshin (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 16/882,919

(22) Filed: May 26, 2020

(65) Prior Publication Data

US 2020/0288224 A1 Sep. 10, 2020

Related U.S. Application Data

(63) Continuation of application No. PCT/JP2018/039028, filed on Oct. 19, 2018.

(30) Foreign Application Priority Data

Nov. 28, 2017 (JP) .............................. JP2017-228110

(51) Int. Cl.
*H04R 1/02* (2006.01)
*B60R 11/02* (2006.01)
*B60R 11/00* (2006.01)
*G01V 1/00* (2006.01)

(52) U.S. Cl.
CPC ............ *H04R 1/02* (2013.01); *B60R 11/0247* (2013.01); *G01V 1/001* (2013.01); *B60R 2011/004* (2013.01); *B60R 2011/005* (2013.01); *H04R 2201/02* (2013.01)

(58) Field of Classification Search
CPC ... H04R 1/02; H04R 2201/02; B60R 11/0247; B60R 2011/004; B60R 2011/005; B60R 19/483; G01V 1/001; G01S 15/931; G01S 2015/937; G01S 7/521; G01H 3/00
See application file for complete search history.

(56) References Cited

U.S. PATENT DOCUMENTS

| 7,357,431 B2 * | 4/2008 | Sato | B60R 19/483 |
| | | | 293/117 |
| 2014/0346303 A1 * | 11/2014 | Hirakawa | G01S 7/521 |
| | | | 248/309.1 |
| 2015/0192673 A1 * | 7/2015 | Wehling | G01S 7/521 |
| | | | 367/138 |

(Continued)

FOREIGN PATENT DOCUMENTS

| DE | 102013011186 A1 * | 1/2014 | .......... G01S 15/931 |
| DE | 102013011186 A1 | 1/2014 | |

(Continued)

*Primary Examiner* — Oyesola C Ojo
(74) *Attorney, Agent, or Firm* — Maschoff Brennan

(57) ABSTRACT

An ultrasonic sensor is provided with a sensor body, a cushion member, a retainer part and a waterproof seal. The sensor body has an ultrasonic microphone and a microphone support part. The cushion member covers a protrusion part of the ultrasonic microphone. The retainer part sandwiches a sandwiched part on a proximal end side between the retainer part and an outer peripheral surface of the ultrasonic microphone, while exposing an exposed part on a tip end side in the axial direction of the cushion member. The waterproof seal blocks a gap between a vehicle body component and the exposed part of the cushion member in an on-board state.

10 Claims, 4 Drawing Sheets

(56) References Cited

U.S. PATENT DOCUMENTS

2016/0282466 A1\* 9/2016 Epler .................. G01S 7/003
2018/0310426 A1\* 10/2018 Cho .................... H05K 5/0017
2019/0004161 A1 1/2019 Ueda et al.

FOREIGN PATENT DOCUMENTS

| JP | 39188-1982 U | | 3/1982 | | |
| JP | 2005130040 A | \* | 5/2005 | ............ | H04R 17/00 |
| JP | 3999187 B2 | | 8/2007 | | |
| JP | 2017-167061 A | | 9/2017 | | |
| JP | 2017-175291 A | | 9/2017 | | |
| JP | 2017175291 A | \* | 9/2017 | ............ | G01S 15/93 |
| WO | WO-2012032584 A1 | \* | 3/2012 | ............ | G01S 7/521 |

\* cited by examiner

ULTRASONIC SENSOR

CROSS-REFERENCE TO RELATED APPLICATION

This application is the U.S. bypass application of International Application No. PCT/JP2018/039028 filed Oct. 19, 2018 which designated the U.S. and claims priority to Japanese Patent Application No. 2017-228110, filed Nov. 28, 2017, the contents of both of which are incorporated herein by reference.

TECHNICAL FIELD

The present disclosure relates to an ultrasonic sensor.

BACKGROUND

JP 3999187 B discloses a mounting structure of an ultrasonic sensor whose performance is not adversely affected by infiltration of water or the like. Specifically, in the mounting structure disclosed in JP 3999187 B, a hole is formed in an outer plate that is exposed to an outer surface, and an ultrasonic sensor is inserted into this hole. A rib for fixing the ultrasonic sensor is provided on an inner surface of the outer plate. The ultrasonic sensor is fixed to this rib via a vibration absorber. The outer plate, rib or vibration absorber located vertically under the ultrasonic sensor is provided with a drainage hole. The drainage hole communicates with a space formed between a casing of the ultrasonic sensor and the outer plate, rib or vibration absorber.

SUMMARY

According to one aspect of the present disclosure, an ultrasonic sensor is configured to be attached to a vehicle body component. The ultrasonic sensor includes:

a sensor body having a columnar ultrasonic microphone that is provided to extend in an axial direction parallel to a center axis line and a microphone support part that supports a supported part on a proximal end side while a protrusion part protrudes on a tip end side in the axial direction of the ultrasonic microphone;

a cushion member provided so as to surround the protrusion part of the ultrasonic microphone and formed of a synthetic resin-based elastic material into a tubular shape;

a retainer part provided further radially outward from the center axis line than the ultrasonic microphone is, and configured to sandwich a sandwiched part on the proximal end side between the retainer part and an outer peripheral surface of the protrusion part of the ultrasonic microphone, while exposing an exposed part on the tip end side in the axial direction of the cushion member; and a waterproof seal provided in intimate contact with the exposed part of the cushion member so as to block a gap between the vehicle body component and the exposed part of the cushion member, in a state in which the ultrasonic sensor is attached to the vehicle body component by inserting the protrusion part of the ultrasonic microphone and the exposed part of the cushion member into mounting holes which are through holes formed in the vehicle body component and fixing the retainer part to the vehicle body component.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
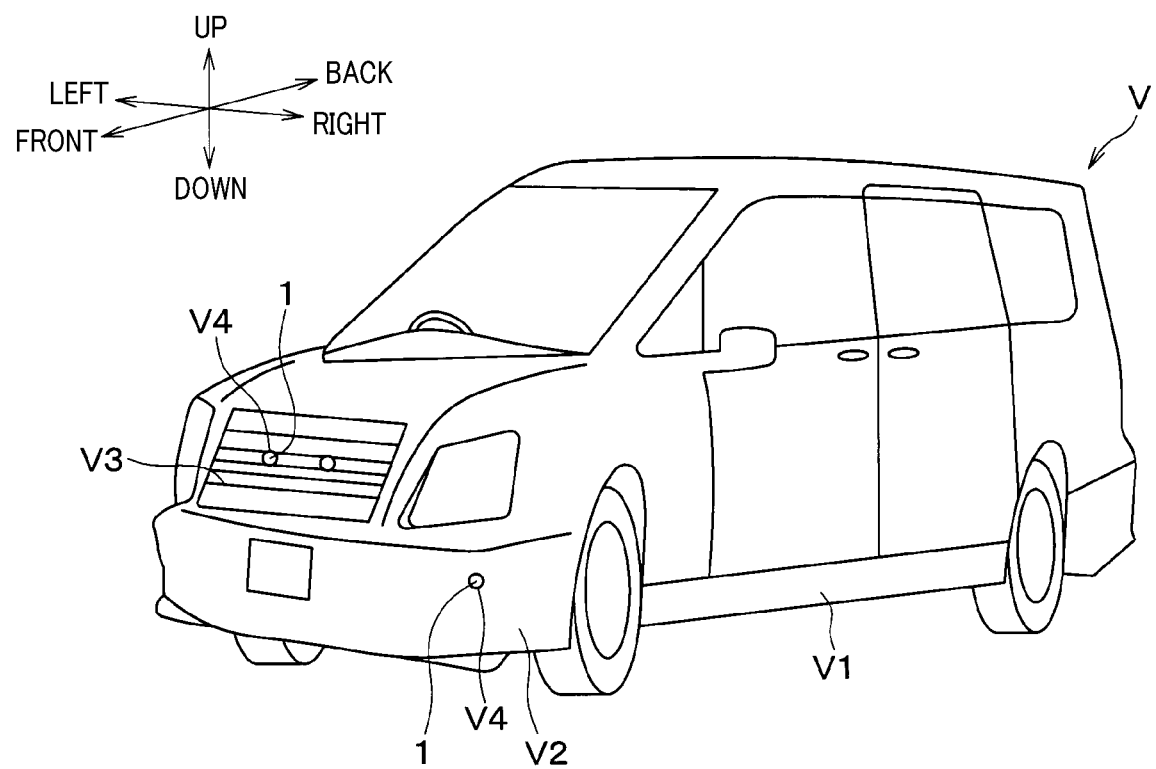
FIG. 1 is an external view of a vehicle mounted with an ultrasonic sensor according to an embodiment.

A known on-board ultrasonic sensor is usually attached to a bumper. That is, in the known on-board ultrasonic sensor, the "outer plate" described above is mainly a bumper. When the ultrasonic sensor is attached to the bumper, it is relatively easy to realize a waterproof structure in the attachment portion. Therefore, in this case, the amount of water infiltrating into the attachment portion is relatively small. Even if water infiltration occurs, the drainage hole as described above can provide good drainage.

On the other hand, from the viewpoint of the obstacle detecting performance or vehicle design, an on-board ultrasonic sensor can sometimes be attached to a front grille. In this case, it is difficult, in terms of design or structure, to provide the drainage hole as described above in the front grille. When water infiltrating from externally is retained in the attachment portion of the ultrasonic sensor to a vehicle body component such as a bumper or a front grille, vibration propagation in the retained water can increase unnecessary reflected waves, thereby causing malfunctions such as erroneous detection.

The present disclosure has been made in light of the above exemplified circumstances and the like. Specifically, the present disclosure provides a configuration that can satisfactorily suppress the deterioration in performance associated with water infiltration caused by rainfall or the like, in an on-board state, in an ultrasonic sensor configured to be attached to a vehicle body component.

According to one aspect of the present disclosure, an ultrasonic sensor is configured to be attached to a vehicle body component. The ultrasonic sensor includes a sensor body having a columnar ultrasonic microphone that is provided to extend in an axial direction parallel to a center axis line and a microphone support part that supports a supported part on a proximal end side while a protrusion part protrudes on a tip end side in the axial direction of the ultrasonic microphone, a cushion member provided so as to surround the protrusion part of the ultrasonic microphone and formed of a synthetic resin-based elastic material into a tubular shape, a retainer part provided further radially outward from the center axis line than the ultrasonic microphone is, and configured to sandwich a sandwiched part on the proximal end side between the retainer part and an outer peripheral surface of the protrusion part of the ultrasonic microphone, while exposing an exposed part on the tip end side in the axial direction of the cushion member, and a waterproof seal provided in intimate contact with the exposed part of the cushion member so as to block a gap between the vehicle body component and the exposed part of the cushion member, in a state in which the ultrasonic sensor is attached to the vehicle body component by inserting the protrusion part of the ultrasonic microphone and the exposed part of the cushion member into mounting holes which are through holes formed in the vehicle body component and fixing the retainer part to the vehicle body component.

In the ultrasonic sensor having such a configuration, the protrusion part on the tip end side in the axial direction of the ultrasonic microphone in the sensor body protrudes from the microphone support part. The cushion member surrounds the protrusion part of the ultrasonic microphone. The retainer part sandwiches the sandwiched part on the proximal end side between the retainer part and the outer peripheral surface of the protrusion part of the ultrasonic microphone, while exposing the exposed part on the tip end side in the axial direction of the cushion member.

The ultrasonic sensor is attached to the vehicle body component by inserting the protrusion part of the ultrasonic microphone and the exposed part of the cushion member into the mounting holes which are through holes formed in the vehicle body component and fixing the retainer part to the vehicle body component. In the on-board state in which the ultrasonic sensor is attached to the vehicle body component, the waterproof seal is provided in intimate contact with the exposed part of the cushion member so as to block the gap between the vehicle body component and the exposed part of the cushion member.

In such a configuration, the gap between the vehicle body component and the exposed part of the cushion member, in the on-board state, is satisfactorily blocked by the waterproof seal. Therefore, the water infiltrating from the external is satisfactorily suppressed from being retained in the gap. Thus, such a configuration makes it possible to satisfactorily suppress the deterioration in performance associated with water infiltration caused by rainfall or the like in the on-board state.

Hereinafter, an embodiment of the present disclosure will be described with reference to the drawings. For convenience of explanation, the front, back, left, right, up and down directions in the configuration of the present embodiment are shown by arrows in the drawings. It should be noted that various modifications applicable to one embodiment will be collectively described after the description of the embodiment since such modifications, if described in the middle of a series of explanations about the embodiment, can interfere with the understanding of the embodiment.

Configuration

With reference to FIG. 1, a vehicle V is a so-called four-wheel automobile, and is provided with an approximately rectangular vehicle body V1 in plan view. To a front end part of the vehicle body V1, a bumper V2 and a front grille V3, which are vehicle body components, are attached. The front grille V3 is arranged above the bumper V2.

The bumper V2 and the front grille V3 are each formed with mounting holes V4 which are through holes for mounting an ultrasonic sensor 1. Specifically, in the present embodiment, the mounting holes V4 are provided at both corners of the bumper V2. In the front grille V3, two mounting holes V4 are provided symmetrically.

The ultrasonic sensor 1 is configured to be attached to the bumper V2 and the front grille V3. Hereinafter, the configuration of the ultrasonic sensor 1 to be attached to the front grille V3 will be described in detail with reference to FIGS. 2 to 4.

Figure 2:
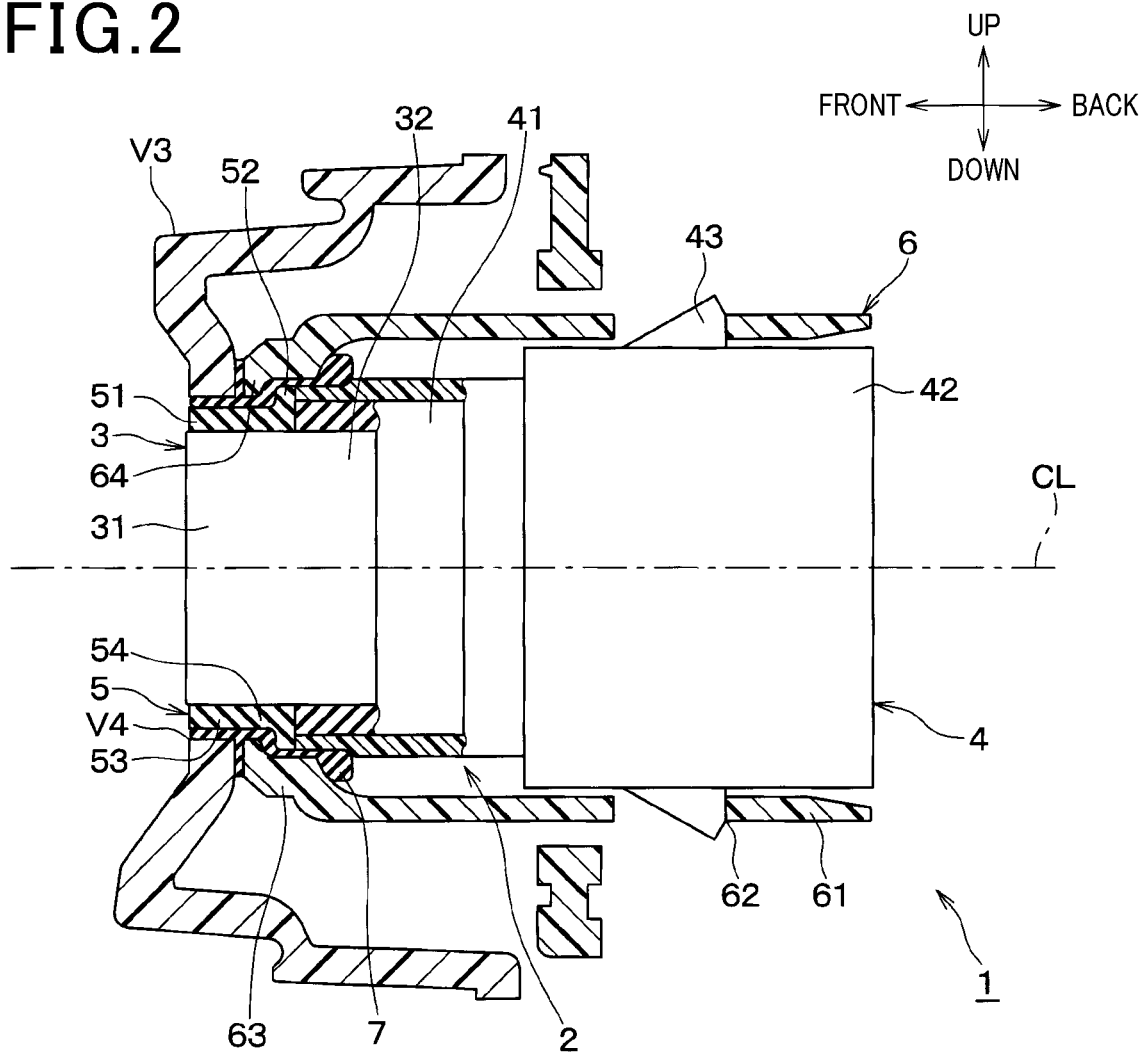
FIG. 2 is a side cross sectional view of the ultrasonic sensor shown in FIG. 1.
Figure 3:
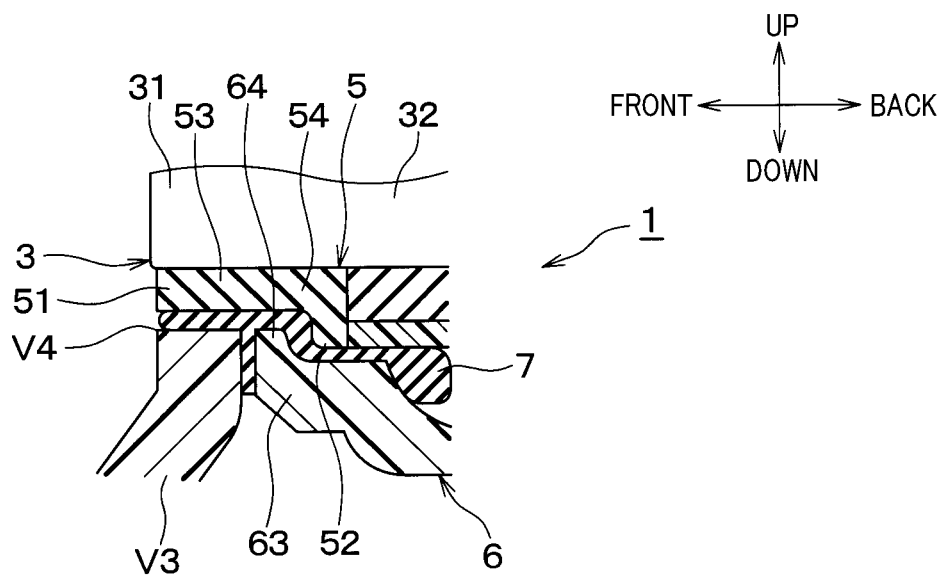
FIG. 3 is an enlarged side cross sectional view of a part of FIG. 2.

With reference to FIGS. 2 and 3, a sensor body 2 that forms a body portion of the ultrasonic sensor 1 has an ultrasonic microphone 3 and a microphone support part 4. The ultrasonic sensor 1 also has a cushion member 5, a retainer part 6, and a waterproof seal 7.

The ultrasonic microphone 3 is configured to be able to transmit/receive ultrasonic waves. Specifically, the ultrasonic microphone 3 is configured to transmit probing waves in a direction along a directional axis and to receive reflected waves from an object present around the vehicle V. The ultrasonic microphone 3 has a columnar outer shape having a center axis line CL parallel to the directional axis. Specifically, in the present embodiment, the ultrasonic microphone 3 is formed into a circular columnar shape that is provided to extend in an axial direction parallel to the center axis line CL.

The ultrasonic microphone 3 has a protrusion part 31 and a supported part 32. The protrusion part 31 is a portion on a tip end side in the axial direction of the ultrasonic microphone 3, which is provided to protrude frontward from the microphone support part 4. The "tip end side in the axial direction" is a side on which the ultrasonic microphone 3 protrudes in the ultrasonic sensor 1, i.e., the sensor body 2, which corresponds to the front side in the drawings. The supported part 32 is a portion on a proximal end side in the axial direction of the ultrasonic microphone 3, which is embedded inside the microphone support part 4. The "proximal end side in the axial direction" is a side opposite to the "tip end side in the axial direction".

The microphone support part 4 has an elastic support member 41 and a sensor case 42. The elastic support member 41 is formed of a synthetic resin-based elastic material such as silicone rubber so as to elastically support the supported part 32 of the ultrasonic microphone 3. Specifically, the elastic support member 41 has a bottomed tubular outer shape that is opened toward the tip end side in the axial direction, and is configured to house the supported part 32 internally in the ultrasonic microphone 3.

The sensor case 42 is integrally formed of a hard synthetic resin such as polybutylene terephthalate. The sensor case 42 is configured to house the elastic support member 41 while covering an outer peripheral surface of the elastic support member 41 at a portion on the tip end side in the axial direction. That is, the microphone support part 4 is configured to elastically support the supported part 32 on the proximal end side, while protruding the protrusion part 31 on the tip end side in the axial direction of the ultrasonic microphone 3.

The sensor case 42 is provided with a plurality of engagement pieces 43. The engagement pieces 43 are provided to protrude in the up and down directions from the outer peripheral surface of the sensor case 42.

The cushion member 5 is provided so as to surround the protrusion part 31 of the ultrasonic microphone 3 in intimate contact. In the present embodiment, the cushion member 5 is integrally and seamlessly formed of a synthetic resin-based elastic material such as a non-foamable silicone rubber. The synthetic resin-based elastic material is referred to also as viscoelastic material or elastomer. In the present embodiment, the cushion member 5 has a tubular part 51 and a flange part 52.

The tubular part 51 is a cylindrical portion provided along the center axis line CL, which has a cylindrical inner surface-shaped inner peripheral surface. This inner peripheral surface is formed so as to be in intimate contact with the circular columnar surface-shaped outer peripheral surface of the protrusion part 31 of the ultrasonic microphone 3. The flange part 52 is formed in a ring shape protruding outward in a radial direction from a proximal end part, i.e., back end part in the axial direction of the tubular part 51. The radial direction is a direction extending radially from the center axis line CL.

A state in which the cushion member 5 and the retainer part 6 are temporarily attached to the sensor body 2 before attachment of the ultrasonic sensor 1 to the front grille V3 is referred to as a temporarily assembled state. In this temporarily assembled state, an exposed part 53 on the tip end side in the axial direction of the cushion member 5 is configured to be exposed from the retainer part 6. Also, this exposed part 53 is configured to be in intimate contact with the inner peripheral surface of the mounting hole V4 in an on-board state. The on-board state is a state in which the ultrasonic sensor 1 is attached to the front grille V3. A sandwiched part 54 on the proximal end side in the axial direction of the cushion member 5 is a portion locked by the retainer part 6 in the temporarily assembled state and the on-board state, which includes a base end part in the axial direction of the tubular part 51 and the flange part 52.

The retainer part 6 is a component used to attach the ultrasonic sensor 1, i.e., the sensor body 2 to the front grille V3, which is provided further radially outward than the ultrasonic microphone 3 and the microphone support part 4 in the temporarily assembled state and the on-board state. In the present embodiment, the retainer part 6 is configured to sandwich the sandwiched part 54 on the proximal end side between the retainer part 6 and the outer peripheral surface of the protrusion part 31 of the ultrasonic microphone 3, while exposing the exposed part 53 on the tip end side in the axial direction of the cushion member 5.

Figure 4:
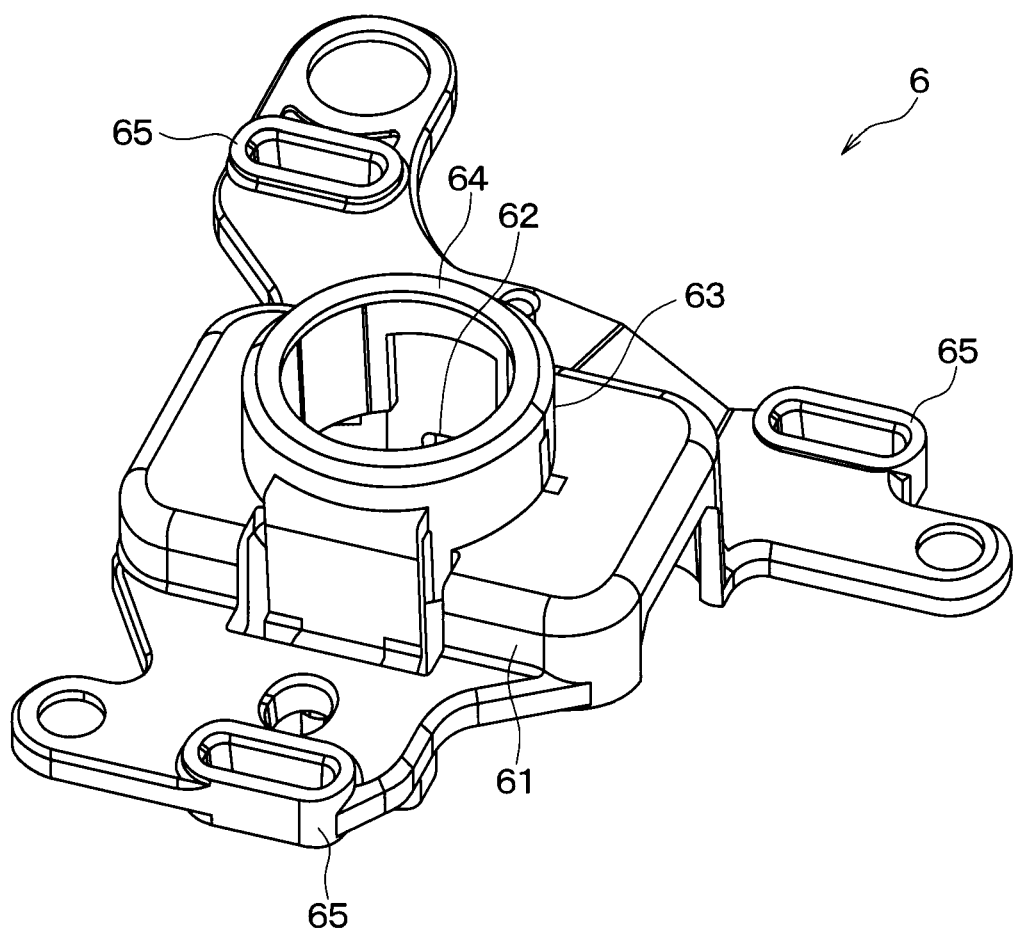
FIG. 4 is a perspective view showing an appearance of a retainer part shown in FIG. 2.

With reference to FIGS. 2 to 4, the retainer part 6 has a body retaining part 61, engagement holes 62, a sandwiching part 63, a flange locking part 64, and a grille fixing part 65. The retainer part 6 is integrally formed of a hard synthetic resin such as an ABS resin.

The body retaining part 61 is formed in a tubular shape so as to cover the sensor case 42 in the temporarily assembled state and the on-board state. The engagement holes 62 are provided at positions corresponding to the engagement pieces 43 in the temporarily assembled state and the on-board state of the body retaining part 61. That is, the retainer part 6 is configured so as to retain the sensor body 2 in a state in which the engagement pieces 43 are engaged in the engagement holes 62 while housing the sensor body 2 in the inner space of the body retaining part 61.

The sandwiching part 63 is an approximately cylindrical portion that is provided on the tip end side in the axial direction of the retainer part 6. The sandwiching part 63 is provided further radially outward than the ultrasonic microphone 3 and the cushion member 5 in the temporarily assembled state and the on-board state. That is, the sandwiching part 63 is provided so as to sandwich the sandwiched part 54 of the cushion member 5 between the sandwiching part 63 and the protrusion part 31 of the ultrasonic microphone 3 in the temporarily assembled state and the on-board state. Also, the sandwiching part 63 is provided to face a portion around the respective mounting holes V4 on the inner surface, i.e., back surface of the front grille V3 across a predetermined gap filled with the waterproof seal 7.

Specifically, a tip end part in the axial direction of the sandwiching part 63 provided along the center axis line CL has the flange locking part 64. The flange locking part 64 is formed in a ring shape which protrudes inward in the radial direction from the tip end part in the axial direction of the sandwiching part 63. The flange locking part 64 has an inner diameter that is approximately the same as the outer diameter of the tubular part 51 of the cushion member 5. Also, the flange locking part 64 is formed such that the amount of protrusion in the radial direction is approximately the same as that of the flange part 52 of the cushion member 5.

That is, the flange locking part 64 is formed so as to be in intimate contact with a portion corresponding to the sandwiched part 54 of the tubular part 51 in the cushion member 5. Also, the flange locking part 64 is provided so as to face the flange part 52 in the cushion member 5, in the axial direction, across the waterproof seal 7. Further, a tip end surface in the axial direction of the flange locking part 64 is formed in a ring shape so as to face the back surface of the front grille V3 across a predetermined gap filled with the waterproof seal 7 in the on-board state.

With reference to FIG. 4, the grille fixing part 65 is arranged radially outside the body retaining part 61. The grille fixing part 65 is provided to be fixed to the front grille V3 when the ultrasonic sensor 1 is attached to the front grille V3.

With reference to FIGS. 2 and 3, in the present embodiment, the waterproof seal 7 is provided in intimate contact with the exposed part 53 and sandwiched part 54 of the cushion member 5. The waterproof seal 7 is a filler formed of a synthetic resin-based elastic material such as a non-foamable silicone rubber, which is filled in a gap that can retain water therein, the gap being formed around the respective mounting holes V4 in the on-board state.

Briefly, the waterproof seal 7 is provided so as to block gaps between the front grille V3 and the retainer part 6, and the cushion member 5 in the on-board state. The on-board state is a state in which the ultrasonic sensor 1 is attached to the front grille V3 by inserting, into the mounting holes V4, the protrusion part 31 of the ultrasonic microphone 3 and the exposed part 53 of the cushion member 5 that covers this protrusion part 31 and fixing the retainer part 6 to the front grille V3.

Specifically, in the present embodiment, the waterproof seal 7 is provided so as to block a gap between the respective mounting holes V4 and the exposed part 53 of the cushion member 5. Also, the waterproof seal 7 is provided so as to block a gap between the sandwiched part 54 in the cushion member 5 and the sandwiching part 63 in the retainer part 6. Further, the waterproof seal 7 is provided so as to block a gap between the inner surface, i.e., back surface of the front grille V3 and the tip end surface in the axial direction of the flange locking part 64. It should be noted that, in the present embodiment, the waterproof seal 7 is made of a material having acoustic characteristics different from those of the cushion member 5, specifically, having an acoustic attenuation rate higher than that of the material for the cushion member 5. That is, the waterproof seal 7 is made of a material having an acoustic impedance different from that of water and an acoustic attenuation rate higher than that of water, from the viewpoint of suppression of erroneous detection due to vibration propagation in water during water infiltration.

Effect

The effects obtained by the configuration of the present embodiment will be described below with reference to the drawings.

When the ultrasonic sensor 1 is attached to the front grille V3, the retainer part 6 is firstly fixed to the front grille V3. Then, the filler for forming the waterproof seal 7 is applied over a range from an inner edge of the respective mounting holes V4 to the inner peripheral surface of the sandwiching part 63 in the retainer part 6.

On the other hand, the protrusion part 31 on the tip end side in the axial direction of the ultrasonic microphone 3 in the sensor body 2 protrudes from the microphone support part 4. Once the cushion member 5 is attached to the sensor body 2, the cushion member 5 covers the protrusion part 31 of the ultrasonic microphone 3 in intimate contact.

Thereafter, the sensor body 2 is inserted into the retainer part 6 from the side of the ultrasonic microphone 3 and the cushion member 5. The engagement pieces 43 are engaged in the engagement holes 62 in a state in which the protrusion part 31 of the ultrasonic microphone 3 is inserted into the approximately cylindrical sandwiching part 63 while being covered with the cushion member 5. Also, the flange locking part 64 and the flange part 52 in the cushion member 5 axially face each other across the waterproof seal 7. Thus, the sensor body 2 is retained by the retainer part 6.

In this manner, the on-board state is realized by attaching, to the retainer part 6, the sensor body 2 attached with the cushion member 5. Briefly, the ultrasonic sensor 1 is attached to the front grille V3 by inserting the exposed part 53 of the cushion member 5 into the mounting hole V4 which is a through hole formed in the front grille V3 and fixing the retainer part 6 to the front grille V3.

The sandwiching part 63 in the retainer part 6 sandwiches the sandwiched part 54 on the proximal end side between the sandwiching part 63 and the outer peripheral surface of the protrusion part 31 of the ultrasonic microphone 3, while exposing the exposed part 53 on the tip end side in the axial direction of the cushion member 5. Specifically, the flange locking part 64 is in an intimate contact with a portion corresponding to the sandwiched part 54 of the tubular part 51. Also, the flange locking part 64 axially faces the flange part 52 in the cushion member 5 across the waterproof seal 7, and thus locks the sandwiched part 54 in the cushion member 5. That is, the waterproof seal 7 is sandwiched between the flange locking part 64 and the flange part 52 of the cushion member 5.

A gap in which water infiltrating from the external during rainfall or car washing is retained is sometimes formed in the attachment portion of the ultrasonic sensor 1 to the front grille V3. Such a gap is typically formed between the front grille V3 and/or the retainer part 6 and the cushion member 5 around the respective mounting holes V4 in the front grille V3. When water infiltrating from externally is retained in such a gap, vibration propagation in the retained water can increase unnecessary reflected waves, thereby causing malfunctions such as erroneous detection.

In this regard, when the ultrasonic sensor 1 is attached to the bumper V2, the occurrence of the above malfunction can be satisfactorily suppressed by providing a rib for fixing the sensor on the inner surface, i.e., back surface side of the bumper V2 and providing a drainage hole in such a rib as described in JP 3999187 B. However, when the ultrasonic sensor 1 is attached to the front grille V3, it is difficult, in terms of design or structure, to provide a rib and a drainage hole, as described above, in the front grille V3.

Thus, in the present embodiment, the waterproof seal 7 is provided in intimate contact with the cushion member 5 so as to block gaps between the front grille V3 and the retainer part 6, and the cushion member 5 in the on-board state. In such a configuration, the gap around the respective mounting holes V4 in the front grille V3 in the on-board state is satisfactorily blocked by the waterproof seal 7. Therefore, the water infiltrating from externally is satisfactorily suppressed from being retained in the gap. Thus, such a configuration makes it possible to satisfactorily suppress the deterioration in performance associated with water infiltration caused by rainfall or the like in the on-board state.

In the present embodiment, the waterproof seal 7 is provided so as to block a gap between the respective mounting holes V4 and the exposed part 53 of the cushion member 5. Also, the waterproof seal 7 is provided so as to block a gap between the sandwiched part 54 of the cushion member 5 and the sandwiching part 63 of the retainer part 6. Further, the waterproof seal 7 is provided so as to block a gap between the inner surface of the front grille V3 and the tip end surface in the axial direction of the flange locking part 64. Thus, according to such a configuration, the gap around the respective mounting holes V4 in the front grille V3 in the on-board state is satisfactorily blocked by the waterproof seal 7. Therefore, the water infiltrating from the external is further satisfactorily suppressed from being retained in the gap.

In the present embodiment, the waterproof seal 7 is a filler formed of a synthetic resin-based elastic material such as silicone rubber. In the present embodiment, the gap between the front grille V3 and the exposed part 53 of the cushion member 5, which can retain water therein, is filled with the filler, so that water infiltration in the attachment portion of the ultrasonic sensor 1 can be suppressed satisfactorily. The waterproof seal 7 is made of a material having acoustic characteristics different from those of the cushion member 5, specifically, having a higher acoustic attenuation rate. That is, the waterproof seal 7 is made of a material having an acoustic impedance different from that of water and an acoustic attenuation rate higher than that of water, from the viewpoint of suppression of erroneous detection due to vibration propagation in water during water infiltration. Thus, according to such a configuration, the deterioration in performance associated with water infiltration caused by rainfall or the like in the on-board state can be satisfactorily suppressed by the simple device configuration or attachment process in the ultrasonic sensor 1.

In the present embodiment, the cushion member 5 is formed separately from the elastic support member 41. This provides good intimate contact between the protrusion part 31 in the ultrasonic microphone 3 and the cushion member 5.

Modifications

The present disclosure is not limited to the above embodiment. Therefore, the embodiment can be appropriately modified. Hereinafter, typical modifications will be described. In the following description of modifications, differences from the above embodiment will be mainly explained. In the above embodiment and the modifications, the same reference numerals are given to the same or equivalent portions. Therefore, in the following description of the modifications, as for the components having the same reference numerals as those in the above embodiment, the descriptions in the above embodiment can be appropriately applied unless there is a technical contradiction or a specific additional explanation.

The present disclosure is not limited to the aspect in which the ultrasonic sensor 1 is attached to the front grille V3. Specifically, the configuration of the above embodiment can be suitably applied to an aspect in which the ultrasonic sensor 1 is attached to the bumper V2. Also, the configuration of the above embodiment can be suitably applied also to an aspect in which the ultrasonic sensor 1 is attached to a vehicle body panel. When the ultrasonic sensor 1 is attached to the bumper V2 or vehicle body panel, the configuration of the retainer part 6 can be appropriately changed depending on the component to which the ultrasonic sensor 1 is attached.

The ultrasonic sensor 1 is not limited to the configuration in which it can transmit/receive ultrasonic waves. Specifically, the ultrasonic sensor 1 may have, for example, a configuration in which it can only transmit ultrasonic waves. Alternatively, the ultrasonic sensor 1 may have only the function of receiving reflected waves of probing waves which are ultrasonic waves transmitted from another ultrasonic sensor 1, the reflected wave being reflected by an object present around the vehicle V.

The configurations of the sensor body 2, cushion member 5 and retainer part 6 are also not limited to the specific examples described in the above embodiment. Specifically, the details of the configurations of the sensor body 2, the cushion member 5 and the retainer part 6 can be appropriately changed within the scope in which the effects obtained by the present disclosure are not reduced or eliminated.

The position where the waterproof seal 7 is provided can be appropriately changed depending on the gap between the front grille V3 and the retainer part 6, and the cushion member 5 in the on-board state or temporarily assembled state. However, a gap in which water can be retained, which is formed around the respective mounting holes V4 in the on-board state, is likely to occur in a portion where the mounting hole V4 and the exposed part 53 of the cushion member 5 face each other. Especially, the gap in which water can be retained tends to occur in the tip end part in the axial direction of the flange locking part 64, and the portion where the back surface of the front grille V3 and the outer peripheral surface of the exposed part 53 in the cushion member 5 face each other.

Thus, the waterproof seal 7 is provided at least in a portion where the mounting hole V4 and the exposed part 53 in the cushion member 5 face each other. Specifically, the waterproof seal 7 can be provided, for example, in a portion where the exposed part 53 of the cushion member 5 and the inner peripheral surface of the mounting hole V4 face each other. For example, the waterproof seal 7 can be provided, for example, in a portion where the exposed part 53 of the cushion member 5 and an open end on the proximal end side in the axial direction of the mounting hole V4. That is, the waterproof seal 7 can be provided in the tip end part in the axial direction of the flange locking part 64, and the portion where the back surface of the front grille V3 and the outer peripheral surface of the exposed part 53 in the cushion member 5 face each other. This can realize a minimum configuration for satisfactorily suppressing the deterioration in performance associated with water infiltration caused by rainfall or the like in the on-board state.

The process when the ultrasonic sensor 1 is attached to the front grille V3 is also not limited to the above specific example. Specifically, for example, an assembly of the sensor body 2, the cushion member 5 and the retainer part 6 in the temporarily assembled state may be applied or filled with the filler for forming the waterproof seal 7. Alternatively, for example, before formation of a temporarily assembled state, the filler for forming the waterproof seal 7 may be applied to the inner peripheral surface of the sandwiching part 63 in the retainer part 6, and then the temporarily assembled state may be formed. Then, the assembly may be attached to the front grille V3.

Figure 5:
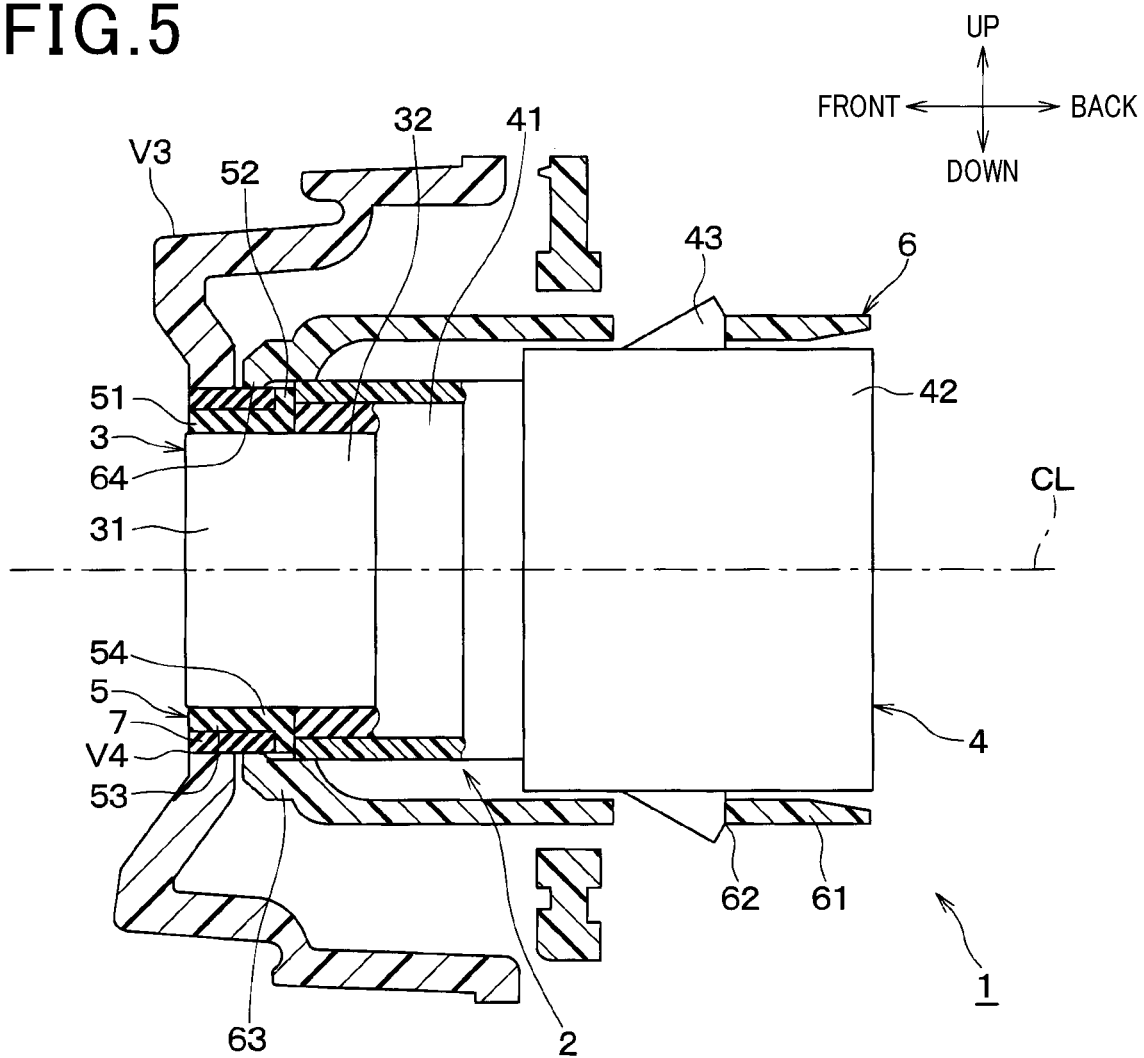
FIG. 5 is a side cross sectional view of an ultrasonic sensor according to a modification.
Figure 6:
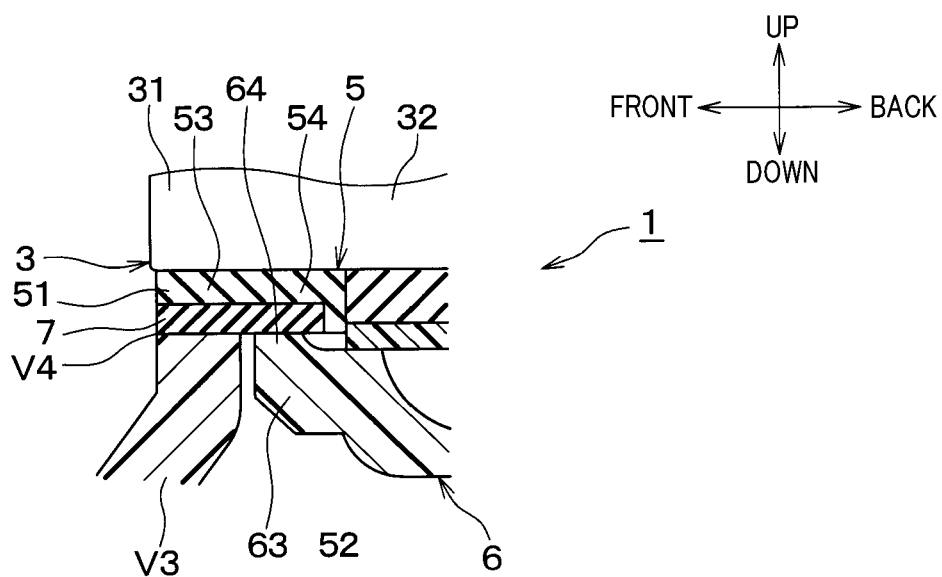
FIG. 6 is an enlarged side cross sectional view of a part of FIG. 5.

The waterproof seal 7 is not limited to the filler. Specifically, the waterproof seal 7 may be, for example, a rubber ring-shaped member, with reference to FIGS. 5 and 6. The waterproof seal 7 is a rubber ring-shaped member, so that the deterioration in performance associated with water infiltration caused by rainfall or the like in the on-board state can be satisfactorily suppressed by the simple device configuration or attachment process in the ultrasonic sensor 1.

The materials forming the respective parts are also not limited to the specific examples indicated in the above embodiment. Specifically, for example, the acoustic attenuation rate and acoustic impedance of the waterproof seal 7 can be adjusted by the qualities of the material, i.e., the kind, hardness, density and the like of the material. Hence, the material forming the waterproof seal 7 can be appropriately adjusted within the scope in which the acoustic impedance is different from that of water and the acoustic attenuation rate is higher than that of water, from the viewpoint of suppression of erroneous detection due to vibration propagation in water during water infiltration.

In the above embodiment, the waterproof seal 7 is made of a material having acoustic characteristics different from those of the cushion member 5. However, the present disclosure is not limited to such an aspect. Specifically, for example, the cushion member 5 may also be made of a material having an acoustic impedance different from that of water and an acoustic attenuation rate higher than that of water like the waterproof seal 7.

Also, in the above embodiment, the cushion member 5 and the waterproof seal 7 are each made of a non-foamable material, from the viewpoint of ensuring water-free property and water impermeability. However, the present disclosure is not limited to such an aspect. Specifically, for example, any closed-cell foaming material having water-free property and water impermeability can be satisfactorily selected as a material forming the cushion member 5 and/or the waterproof seal 7.

In the above description, a plurality of components formed seamlessly and integrally with each other may be formed by bonding separate members to each other. Similarly, a plurality of components formed by bonding separate members to each other may be formed seamlessly and integrally with each other.

In the above description, a plurality of components made of the same material may be made of different materials. Similarly, a plurality of components made of different materials may be formed of the same material.

Needless to say, elements constituting the above embodiment are not necessarily essential, unless the elements are explicitly stated as essential and unless the elements are considered to be essential in principle. Also, when a numerical value such as the number, numerical value, amount, range, or the like of a component is mentioned, especially, unless the numerical value is explicitly stated as essential, and unless the numerical value is clearly limited to a specific number in principle, the present disclosure is not limited to the specific number. Similarly, when the shape, direction, positional relationship, or the like of a component are mentioned, especially, unless the shape, direction, positional relationship, or the like is explicitly stated as essential, and unless the shape, direction, positional relationship, or the like is clearly limited to a specific number in principle, the present disclosure is not limited to the shape, direction, positional relationship, or the like.

The modifications are not limited to the above examples. Also, a plurality of modifications can be combined with each other. Furthermore, all or part of the above embodiment and all or part of the modifications can be combined with each other.

What is claimed is:

1. An ultrasonic sensor configured to be attached to a vehicle body component, the ultrasonic sensor comprising:
   a sensor body having a columnar ultrasonic microphone that is provided to extend in an axial direction parallel to a center axis line and a microphone support part that supports a supported part on a proximal end side while a protrusion part protrudes on a tip end side in the axial direction of the ultrasonic microphone;
   a cushion member provided so as to surround the protrusion part of the ultrasonic microphone and formed of a synthetic resin-based elastic material into a tubular shape;
   a retainer part provided further radially outward from the center axis line than the ultrasonic microphone is, and configured to sandwich a sandwiched part on the proximal end side between the retainer part and an outer peripheral surface of the protrusion part of the ultrasonic microphone, while exposing an exposed part on the tip end side in the axial direction of the cushion member; and
   a waterproof seal positioned and sandwiched between the cushion member and the vehicle body component and provided in intimate contact with the exposed part of the cushion member so as to block a gap between the vehicle body component and the exposed part of the cushion member, in an on-board state in which the ultrasonic sensor is attached to the vehicle body component by inserting the protrusion part of the ultrasonic microphone and the exposed part of the cushion member into mounting holes which are through holes formed in the vehicle body component and fixing the retainer part to the vehicle body component.

2. The ultrasonic sensor according to claim 1, wherein the waterproof seal is provided so as to block a gap between a respective mounting hole and the exposed part of the cushion member.

3. The ultrasonic sensor according to claim 1, wherein the waterproof seal is provided so as to block a gap between the exposed part of the cushion member and the retainer part.

4. The ultrasonic sensor according to claim 1, wherein the waterproof seal is a filler.

5. The ultrasonic sensor according to claim 1, wherein the waterproof seal is a rubber ring-shaped member.

6. The ultrasonic sensor according to claim 1, wherein the waterproof seal is made of a material having acoustic characteristics different from those of the cushion member.

7. The ultrasonic sensor according to claim 1, wherein the waterproof seal is made of a material having an acoustic attenuation rate higher than that of water.

8. The ultrasonic sensor according to claim 1, wherein the microphone support part has an elastic support member formed of a synthetic resin-based elastic material so as to elastically support the supported part in the ultrasonic microphone, and
   the cushion member is formed separately from the elastic support member.

9. The ultrasonic sensor according to claim 1, wherein the vehicle body component is a front grille.

10. The ultrasonic sensor according to claim 1, wherein the waterproof seal configured to block a gap between the vehicle body component and the retainer part.

* * * * *